CONCENTRATION DISTRIBUTION

REFRACTIVE INDEX DISTRIBUTION 3,817,731
PRODUCTION OF LIGHT-CONDUCTING GLASS
FIBERS BY VAPOR PARTIAL PRESSURE
ATMOSPHERE
Mitsugi Yoshiyagawa, Tokyo, Japan, assignor to Nippon
Selfoc Kabushiki Kaisha (also known as Nippon Selfoc
Co., Ltd.), Tokyo-to, Japan
Continuation-in-part of abandoned application Ser. No.
861,904, Sept. 29, 1969. This application May 15, 1972,
Ser. No. 253,364
Claims priority, application Japan, Oct. 3, 1968,
43/72,695
Int. Cl. C03b 15/00; F16c 1/06
U.S. Cl. 65—32                                          6 Claims

ABSTRACT OF THE DISCLOSURE

A glass fiber containing glass-forming and glass-modifying oxides is maintained at a temperature above its strain point and under a vacuum for a certain time thereby to have the modifying oxide vaporize off the fiber whereby the fiber has such a refractive index distribution, in a cross section thereof transverse to the direction of light advance therethrough, that the refractive index decreases continuously from the center toward the other periphery of the cross section.

CROSS-REFERENCE TO RELATED APPLICATIONS

This application is a continuation-in-part of my application Ser. No. 861,904, filed Sept. 29, 1969, entitled "Production of Light Conducting Glass Fibers," and now abandoned.

BACKGROUND OF THE INVENTION

This invention relates generally to materials and structures through which light and images can be conducted and more particularly to light-conducting glass fibers or filaments. More specifically, the invention concerns a method of producing light-conducting glass fibers each exhibiting a refractive index distribution wherein the index decreases in a continuous manner outward from the center in cross sections of the fiber perpendicular to the intended direction of advance of conducted light.

A light-conducting fiber known heretofore consists, essentially, of a core body for light conduction having a relatively high refractive index and a covering layer having a relatively low refractive index and covering the core body. An interface is formed between the core structure and the covering layer. When a light beam is introduced into one end of the core body at an angle greater than the critical reflection angle of this interface, this light beam is repeatedly reflected from the interface and is thereby conducted through the fiber core body.

However, such a clad-type, light-conducting fiber of known type wherein reflection is utilized to conduct the light has various drawbacks, the most serious of which are as follows.

As an incident light beam introduced into the fiber advances by undergoing repeated total reflection, differences in the lengths of light paths between the light rays of the beam develop, so that lags in phase velocities occur when the light beam leaves the fiber. When such lags in phase velocities are present, it becomes difficult to transmit light signals varying at high speed when the light-conducting fiber is to be utilized for communication depending on light.

Furthermore, as the light beam introduced into the fiber advances as it is reflected at the interface, the width thereof progressively expands, and, at the same time, reflection loss occurs at the interface. This result also becomes a cause of impairment of the efficiency of light communication.

As means for conducting images or pictures, optical fiber plates and optical fiber bundles each consisting essentially of a large number of clad-type optical fibers in the desired arrangement are being used. Each of these fibers consists of a light-conducting core body of high refractive index and a cover layer of lower refractive index covering the core body.

In image-conducting means of this character, however, the individual optical fibers merely conduct light as spots, and, accordingly, the resolution of the entire means is determined by the diameter of the optical fibers. While the resolution can be increased to a certain degree by using fibers of small diameter, there is a lower limit to the fiber diameter which can be obtained, it being extremely difficult to produce optical fibers of diameters below 10 microns, whereby there is also a limit to the resolution which can be attained. Furthermore, the smaller the diameter of the optical fibers is, the more complicated will the work of producing the image-conducting structure from these fibers be, whereby the efficiency of this process will be low.

SUMMARY OF THE INVENTION

It is an object of the present invention to provide a method of producing light-conducting glass fibers in which lag in phase velocities in a light beam at the exit end of the fibers and spreading of width and reflection loss of the light beam are prevented thereby to provide light-conducting fibers highly suitable for use in ultra-high-speed, light-pulse communication and in ultra-high speed, laser pulse amplification.

Another object of the invention is to provide a method of producing light-conducting glass fibers or filaments suitable for use in the fabrication of image-conducting structures of simple construction, and a single fiber of which is capable of conducting images.

According to the present invention, briefly summarized, there is provided a method of producing light-conducting glass fibers in which a glass fiber containing at least one glass-forming oxide and at least one glass-modifying oxide is subjected to a temperature above the strain point of the fiber and an atmosphere having a vapor pressure which is lower than the saturated vapor pressure of said glass-modifying oxide at said temperature, both maintained for a substantially long period thereby to cause the fiber to have a refractive index distribution in a cross section thereof perpendicular to the direction of light advance therethrough wherein the refractive index decreases continuously from the center toward the periphery of the cross section.

The nature, principle, details and utility of the invention will be more clearly apparent from the following detailed description beginning with general considerations and concluding with specific examples of practice constituting preferred embodiments of the invention, when read in conjunction with the accompanying drawing.

DETAILED DESCRIPTION

Figure 1:
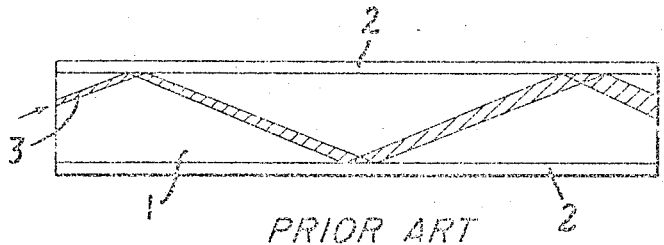
FIG. 1 is a diagrammatic side view indicating the manner in which light is conducted through and by a light-conducting fiber of known clad type.

As mentioned briefly hereinbefore and as indicated in FIG. 1, a light-conducting fiber of known type consists essentially of a core body 1 of a relatively high refractive index and a covering layer 2 of a relatively low refractive index covering the core body, an interface being formed therebetween. An incident light beam 3 introduced into the core body through one end thereof at an angle greater than the critical reflection angle of this interface is conducted through and along the core structure 1 as it is repeatedly reflected from the interface.

Figure 2:
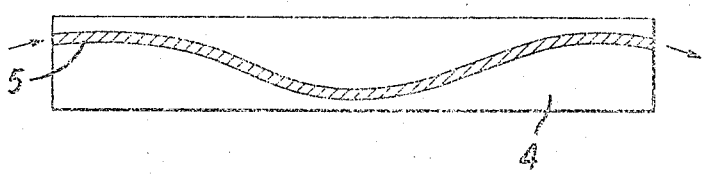
FIG. 2 is a similar view indicating the manner in which light is conducted through and by a glass fiber produced in accordance with the method of the invention.

In contrast, when an incident light beam 5 is introduced into one end of a light-conducting glass fiber 4 as shown in FIG. 2 and having a refractive index distribution wherein the index increases progressively inward from the outer surface of the fiber, as in a glass fiber produced according to the invention, the incident light 5 advances through the fiber 4 without being reflected at the outer surface of the fiber. Therefore, phase-velocity lag and width spreading of the light beam and light reflection loss are substantially reduced.

This highly desirable performance is due to a principle which is similar to that of a so-called gas lens. A glass fiber in which the refractive index in a cross section thereof is radially symmetrical about the center of the section and increases progressively inward from the outer surface (periphery of the cross section) is highly desirable since phase-velocity lag at the light exit and of the fiber and width spreading of a light beam being conducted can be substantially reduced.

It is most desirable that the above mentioned refractive index distribution be representable by a quadratic curve of the form $$n = n_0(1 - ar^2)$$

where:

$r$ the distance in the radial direction from the center of the fiber;

$n_0$ is the refractive index of the glass at the center of the fiber;

$n$ is the refractive index of the glass at a point a distance $r$ from the center; and $a$ is a positive constant, which is usually from $2 \times 10^{-4}$ mm.$^{-2}$ to $2 \times 10^2$ mm.$^{-2}$, especially from $1 \times 10^{-3}$ mm.$^{-2}$ to $1 \times 10^2$ mm.$^{-2}$ when the distance $r$ is expressed in terms of mm. (millimeter).

(These symbols $r$, $n_0$, $n$, and $a$ are used hereinafter in accordance with the above definitions.) When an incident light having a constant pulse width is introduced into a glass fiber having the above defined refractive index distribution, the light is conducted through the fiber as it maintains the constant pulse width without phase-velocity lag and leaves the fiber from the exit end thereof.

When this light-conducting fiber is physically curved until it assumes a radius of curvature less than a certain limiting value, rays of an incident light beam entering the fiber at one end thereof are reflected by the outer surface thereof or escape out of the fiber. This limiting value of radius of curvature is determined by the refractive index distribution within the fiber. That is, this limiting radius of curvature ordinarily decreases with increase in the refractive index gradient.

Figure 3:
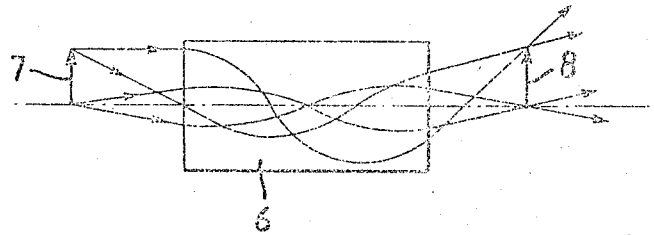
FIG. 3 is a diagrammatic side view indicating the manner in which an image is conducted through a glass fiber produced according to the method of the invention.

The manner in which an optical fiber produced in accordance with the invention conducts an image is illustrated in FIG. 3, in which the optical fiber 6 having in a cross section perpendicular to the intended direction of advance of incident light a refractive index distribution substantially satisfying the aforementioned equation $n = n_0(1 - ar^2)$. When an object 7 is placed in front of the optical fiber 6, light rays from this object enter the fiber, and each light ray advances with a sinusoidal wave from wherein the intrinsic or natural wavelength S is $2\pi/2\sqrt{2a}$, whereby a real image 8 is formed outside of the fiber 6.

While the real image 8 is described above and indicated in FIG. 3 as being formed outside of the fiber 6, it is also possible to form the image in the plane of the light exit surface of the optical fiber 6 by suitably adjusting the length of the fiber and the distance between the object 7 and the optical fiber 6. It is possible, furthermore, to adjust the magnification or reduction.

The refractive index of a glass is dependent principally on the composition of that glass. Accordingly, a glass structure in which the refractive index therewithin varies progressively can be obtained by causing the glass to have a glass composition distribution wherein the composition differs progressively. Furthermore, a light-conducting glass fiber in which the refractive index increases progressively inward from the outer surface can be obtained by causing a glass fiber to have a glass composition distribution wherein the composition differs progressively from the outer surface toward the interior of the fiber. However, glass structures, particularly glass fibers, having glass composition distributions wherein the refractive index varies progressively could not be easily produced heretofore.

In accordance with the present invention, there is provided a method of producing glass fibers each having a refractive index distribution in a cross section perpendicular to the direction of advance of light within the glass fiber in which the relationship $n = n_0(1 - ar^2)$ is substantially satisfied, whereby the glass fibers are capable of accomplishing ultra-high-speed, light pulse communication, ultra-high-speed, laser pulse amplification, and image conduction.

This method of the invention can be practiced, in general, by forming a glass fiber composed essentially of one or more glass-forming oxides and one or more glass-modifying oxides and exposing the glass fiber thus formed to an elevated temperature and an atmosphere having a vapor pressure which is lower than the saturated vapor pressure of said glass-modifying oxide at said temperature such as a high degree of vacuum by maintaining the fiber for a long time in a furnace under a high vacuum at an elevated temperature above the strain point and preferably below the softening point of the glass fiber. The glass-modifying oxides which is present near the outer surface of the fiber are thereby caused to vaporize, and a concentration gradient thereof in directions within the fiber cross sections is produced. As a result, a glass fiber having a refractive index distribution in cross sections perpendicular to the light advance direction which substantially satisfies the equation $n = n_0(1 - ar^2)$ is produced.

In general, cations of larger ratios of electronic polarizability to (ion radius)$^3$ within a glass have a tendency to contribute more greatly to increase in refractive index. That is, this tendency in the case of monovalent cations is of the sequence: $Tl > Li > K \doteq Na \doteq Rb$. In the case of divalent cations, the relationship thereof in the order of degree of contribution toward increase in the glass refractive index is: $Pb > Ba > Cd > Sr > Ca > Zn > Be > Mg$.

Physical substances (solids and liquids) respectively have characteristics vapor pressures. In general, these vapour pressures increase exponentially with rise in temperature. Futhermore, the rate of vaporization of a physical substance increases when that substance is surrounded by a vacuum or an atmosphere having a vapor pressure lower than the saturated vapor pressure at given temperature of the substance, and this rate increases with the degree of vacuum.

When a substance composed of complicated constituents, such as a glass, is placed under conditions conducive to evaporation, such as high temperature and high vacuum, the vaporization from this substance is such that specific constituents evaporate in particularly large quantities since the vapor pressure of the various constituents of the substance differ greatly.

Oxide glasses contain glass-forming oxides and glass-modifying oxides in uniform distributions, but glass-modifying oxides are in general, more vaporizable than glass forming oxides, and glasses after vaporization of modifying oxides will in general has lower refractive indexes than the original glasses.

This phenomenon of glasses is utilized in the present invention, a feature of which is the placing of glass fibers containing glass-forming and glass-modifying oxides under conditions of elevated temperature and high vacuum thereby to cause the glass-modifying oxides to evaporate.

Glass-modifying oxides have much higher vaporization rates than glass-forming oxides. For example, when a glass comprising $SiO_2$ which is a glass-forming oxide and PbO which is a glass-modifying oxide is heated at a temperature of approximately 700° C. under vacuum, the rate of vaporization out of the glass of PbO is a million times as large as that of $SiO_2$ or even larger. At this temperature, PbO may have saturated vapor pressure of approximately $4 \times 10^{-3}$ mm. Hg and $SiO_2$ may have saturated vapor pressure of approximately $3 \times 10^{-9}$ mm. Hg.

When a glass fiber which contains a glass-forming oxide and a glass-modifying oxide in uniform concentrations within the glass and which has a uniform refractive index throughout the fiber is placed at an elevated temperature and high vacuum, the glass-modifying oxide near the surface of the fiber will vaporize off the fiber through the periphery surface thereof, since the saturated vapor pressure of the glass-modifying oxide is higher than the pressure of the vacuum or gaseous atmosphere surrounding the fiber, or, more precisely, than the partial pressure of the vapor of the glass-modifying oxide in the vacuum or the gaseous atmosphere which comprises the vapor of the modifying oxide.

Once the concentration of the modifying oxide near the surface of the fiber is lowered by the vaporization, the modifying oxide remaining within the interior of the fiber will move by diffusion toward the surface so as to compensate for the difference in concentrations of the modifying oxide at the surface and in the interior of the fiber. When the fiber is placed under such conditions for a certain duration of time, the concentration of the modifying oxide nearer the surface is decreased more intensely than that in the interior of the glass, and the concentration of a forming oxide nearer the surface of the fiber is on the contrary increased more intensely corresponding to the decrease in concentration of modifying oxide at that place. Thus, the refractive index of glass nearer the surface of the fiber is much lower than the original one. In a cross-section of the fiber perpendicular to the central axis thereof, concentrations of the modifying oxide and the forming oxide continuously decreases and increases, respectively, from the central axis toward the periphery of the fiber, and, since a glass part containing a modifying oxide in a lower concentration and a forming oxide in a higher concentration has a lower refractive index than the original glass, the refractive index continuously decreases from the central axis toward the surface of the fiber.

In the case where the duration of time of such heat treatment under vacuum is relatively short, the concentration gradient of modifying and forming oxides an thus the refractive index gradient will be produced only at the surface of the fiber, and the concentrations of modifying and forming oxides and refractive index will remain substantially unchanged in a deeper part of the glass fiber. In the case where the duration of time is relatively long, concentrations of modifying and forming oxides are decreased and increased from the original ones even at the central axis, respectively, and refractive index at the center axis is decreased from the original one. In the case where the duration of time is excessively long, almost all of the modifying oxide within the fiber will vaporize off the fiber, and the concentration gradients of the modifying and forming oxides within the glass fiber are not produced amply enough to establish a required refractive index gradient.

Thus, when the duration of time is so selected as to produce within the glass fiber such concentration of modifying oxide that it is substantially the same as the original one at the center axis and is slightly lowered at a place slightly distant from the axis or that it is lowered at the center axis, the concentration of modifying oxide will decrease continuously from the central axis toward the outer surface of the fiber in proportion to the square of the radial distance from the central axis of the fiber and the concentration of forming oxide will thus increase continuously from the center toward the outer surface of the fiber in proportion to the square of the radial distance from the center axis of the fiber. Since refractive index of a glass varies substantially in proportion to variation in the concentration of oxides within the glass, the fiber will have a preferable refractive index distribution such that it continuously decreases from the center axis toward the outer or periphery surface thereof substantially in proportion to the square of the radial distance from the axis. In such a preferable refractive index gradient, the concentration of modifying oxide at the outer surface can be substantially zero if desired.

While the glass-modifying oxides have much higher vaporization rates than the glass-forming oxides, there are not little differences in the vaporization rates even among the glass-modifying oxides. In the selection of the glass-modifying oxides, features thereof such as vaporization rates, degree of contribution to the refractive index, and suitability of the diffusion within the glass must be considered. I have found that $Tl_2O$ and $Cs_2O$ among monovalent glass-modifying oxides and PbO and CdO among divalent glass-modifying oxides are particularly convenient because of their great contribution to the glass refractive index and their high vaporization rates.

The process temperature must be sufficiently high to cause vaporization of the glass-modifying oxides and yet must be sufficiently low to preserve the original shape of the fiber. Therefore, it is necessary that this temperature be above the strain point and preferably below the softening point of the glass fiber. The degree of vacuum used in the process should be made as high as possible that is, for example, a pressure lower than $10^{-2}$ mm. Hg, since the evaporation is increasingly pormoted by increasing the degree of vacuum.

When a glass fiber containing a glass-modifying oxide which is capable of contributing greatly to the refractive index and, moreover, has a high vaporization rate, is maintained for a sufficient time in a high vacuum at a temperature above the strain point and preferably below the softening point, in accordance with the invention, the evaporation of the glass-modifying oxide which is present near the outer surface gives rise to a difference in concentrations of this oxide between the interior and outer surface of the glass fiber, and diffusion of this oxide occurs within the glass fiber from the interior toward the outer surface thereof.

The distribution of concentration of the glass-modifying oxide in a cross section of the glass fiber perpendicular to the light advance direction substantially conforms to a diffusion equation with the result that a glass fiber in which the aforementioned refractive index distribtuion in a transverse section substantially satisfies the equation $n = n_0 (1 - ar^2)$.

For the light-conducting glass fiber produced by the method of the invention, silicate glasses, borate glasses, phosphate glasses, and other oxide glasses can be used.

When an incident light beam is introduced into one end of a light-conducting glass fiber produced according to the invention, the direction of advance of light is curved without the occurrence of reflection of the light beam within the glass fiber. That is, the incident light advances in the light advance direction as it curves toward the side of higher refractive index. Accordingly, by using the light-conducting fiber of the invention, it is possible to curve the light advance direction.

Furthermore, a light-conducting glass fiber having a refractive index distribution in a cross section perpendicular to the light-conducting direction which is radially symmetrical about the fiber center line or central axis and is such that the refractive index decreases with distance away from the center line can be caused to function as a convex lens such as that for focusing light beams.

Since an incident light beam advances through the glass fiber of the invention without reflection thereof, there is no phase velocity lag in the light beam exiting from the fiber, and, moreover, spreading of the light beam width is prevented. Accordingly, it is possible to utilize the light-conducting glass fiber of the invention in light communication to transmit efficiently light signals varying at high speed. By providing a light-conducting glass fiber of the invention in one part of a light-conducting path in a light-communication system and utilizing the flexibility possessed by the fiber, the position and direction of light leaving the exit surface of the fiber can be adjusted at will.

In contrast to light-conducting glass fibers of known clad type, each of which always required a glass covering layer for reflection, the light-conducting glass fiber of the invention does not always require a covering layer for reflection. Accordingly, a feature of the fiber of the invention is that the effective area for light conduction is large, and, moreover, the production thereof is facilitated.

The light-conducting glass fiber of the invention can also be coated over its outer surface, in accordance with necessity, with a substance of lower refractive index, a light-absorbent substance, or a light-reflective substance. Furthermore, it is also possible to assemble a plurality of these fibers into a fiber bundle or a fiber plate. The fibers of this invention can be practically applied to a wide variety of light-conducting devices and apparatuses including those for communication by laser and other kinds of light and those for various modes of image conduction.

The term "fiber" or "filament" as herein used should be interpreted as meaning any physical structure having a cross section which is relatively small in relation to the length thereof irrespective of the shape of the cross section.

In order to indicate still more clearly the nature and utility of the present invention, the following examples of practice constituting preferred embodiments thereof and results are set forth, it being undersiood that these examples are presented as illustrative only and that they are not intended to limit the scope of the invention. Throughout these examples, all percentages are by weight.

EXAMPLE 1

A glass fiber of 0.1 mm. diameter and a composition essentially of 50 percent of $Tl_2O$ and 50 percent of $SiO_2$ was prepared. The glass fiber had a refractive index of 1.58, a strain point (the temperature at which the glass viscosity is $10^{14.5}$ poises) of 430° C., and a softening point (the temperature at which the glass viscosity is $10^{7.65}$ poises) of 680° C.

Figure 4:
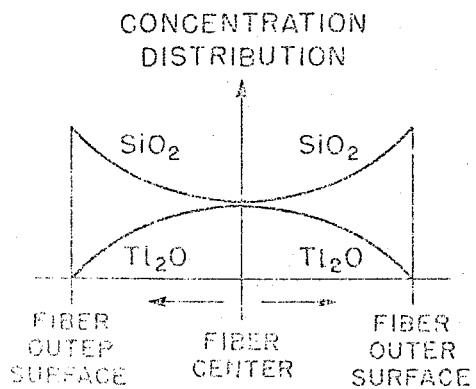
FIG. 4 is a diagrammatic illustration of the concentration distribution of $SiO_2$ and $Tl_2O$ in a cross-section of a glass fiber produced according to the invention.

This glass fiber was suspended within an electric furnace which could be hermetically sealed, and the furnace temperature was maintained at approximately 470° C. The internal pressure of the furnace was reduced to approximately $10^{-4}$ mm. Hg by means of a vacuum pump connected to the furnace. At these values of temperature and pressure the glass fiber is thus maintained at a temperature above the strain point and in an atmosphere wherein the partial pressure of the $Tl_2O$ component is below the saturated vapor pressure of the $Tl_2O$ component, so that vaporization of the $Tl_2O$ component occurs. This vaporization and the resultant outward diffusion of the $Tl_2O$ produces a concentration distribution of the components as illustrated in FIG. 4. The glass fiber was continuously subjected to these conditions of temperature and pressure for 16 hours.

Figure 5:
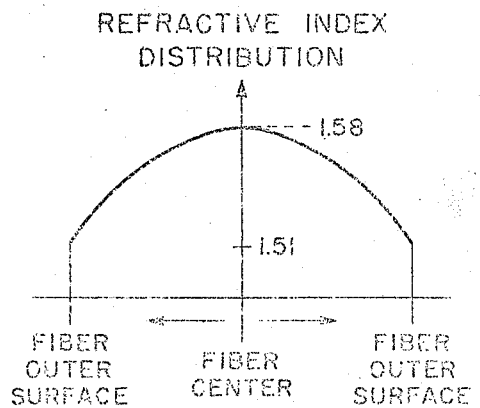
FIG. 5 is a diagrammatic illustration of the refractive index distribution in a cross-section of a glass fiber produced according to the invention.

The glass fiber thus processed had a refractive index of 1.58 at its center line part and a refractive index of 1.51 at the outer surface. The glass composition at the center of the fiber was substantially the same as the original one, and the glass composition at the surface of the glass was such that concentration of $Tl_2O$ was approximately 0% and of $SiO_2$ was approximately 100% and that concentration of $Tl_2O$ and $SiO_2$ decreased and increased, respectively, from the center toward the surface of the fiber substantially parabolically. It was found also that the refractive index distribution over a cross section perpendicular to the light advance direction was such that the refractive index decreased substantially parabolically from the center toward the outer surface of the fiber as shown diagrammatically in FIG. 5, and the refractive index gradient was expressed by the aforementioned equation in which the constant $a$ was 17.7 mm$^{-2}$.

A part of a piece of this glass fiber of a length of approximately 10 cm. was deflected into a curved shape of a radius of curvature of 1 cm., and an incident light beam of a width of approximately 0.01 mm. was projected into the central part of one end surface of this glass fiber, whereupon the light beam advanced through and along the glass fiber interior along an undulating path and, moreover, without being reflected by the fiber outer surface until the light beam reached the other end of the fiber.

It was found that the width of the light beam thus reaching this other end of the fiber was substantially equal to the width of the light beam at the time of its incidence.

EXAMPLE 2

A glass fiber of 0.1 mm. diameter and a composition of 55 percent of PbO and 45 percent of $SiO_2$ and having a refractive index of 1.63, a strain point of 580° C., and a softening point of 760° C. was prepared. This glass fiber was suspended within an electric furnace which could be hermetically sealed, and the furnace temperature was maintained at approximately 700° C. With the fiber in this state, the furnace internal pressure was reduced to approximately $10^{-4}$ mm. Hg, which is lower than the saturated vapor pressure of PbO within the glass at the furnace temperature, namely $4 \times 10^{-3}$ mm. Hg, by means of a vacuum pump connected to the furnace, and the glass fiber was maintained for 24 hours under these conditions of temperature and pressure, during which the PbO component vaporized off the fiber through the outer surface thereof.

As a result of this process, the glass fiber was found to have a refractive index of 1.63 at its center line part and of 1.53 at the outer surface. The glass composition at the center line part was substantially the same as the original one, and the glass composition at the outer surface was substantially zero percent of PbO and substantially 100% of $SiO_2$, the concentration of PbO and of $SiO_2$ decreasing and increasing, respectively, from the center line toward the outer surface substantially parabolically. It was found additionally that the refractive index distribution over a cross section perpendicular to the light advance direction was such that the refractive index decreased substantially parabolically from the center toward the outer surface of the fiber whereby the constant $a$ of the equation was 24.5 mm.$^{-2}$.

A part of a piece of this glass fiber of a length of approximately 10 cm. was deflected into a curved shape of a radius of curvature of 1 cm., and an incident light beam of a width of approximately 0.01 mm. was projected into the central part of one end surface of this glass fiber, whereupon the light beam advanced through and along the fiber interior along an undulating path end, moreover, without being reflected by the fiber outer surface until the light beam reached the other end of the fiber.

It was found that the width of the light beam thus reaching this other end of the fiber was substantially equal to the width of the light beam at the time of its incidence.

EXAMPLE 3

A glass fiber of 0.1 mm. diameter and a composition of 16 percent of $Tl_2O$, 48% of $SiO_2$, 24% of PbO, and 12% of $Na_2O$, and having a refractive index of 1.60, a strain point of 360° C., and a softening point of 540° C. was prepared.

This glass fiber was suspended within an electric furnace which could be hermetically sealed, and the furnace temperature was maintained at approximately 430° C. The internal pressure of the furnace was reduced to approximately $10^{-4}$ mm. Hg by means of a vacuum pump connected to the furnace. The glass fiber was continuously subjected to these conditions of temperature and pressure for 40 hours. The pressure, $10^{-4}$ mm. Hg, is lower than the saturated vapor pressure of $Tl_2O$ within the glass at the furnace temperature, approximately $10^{-2}$ mm. Hg, and thus vaporization of $Tl_2O$ component principally occurred.

The glass fiber thus processed had a refractive index of 1.59 at its center line part and a refractive index of 1.56 at the outer surface.

The glass composition at the center of the fiber was 13.0% of $Tl_2O$, 49.5% of $SiO_2$, 25.0% of PbO, and 12.5% of $Na_2O$, and the glass compostion at the surface of the fiber was 3.0% of $Tl_2O$, 55.5% of $SiO_2$, 27.7% of PbO, and 13.8% of $Na_2O$, whereby the concentration of $Tl_2O$ decreased from the center toward the surface substantially parabolically and the concentrations of $SiO_2$, PbO and $Na_2O$ increased from the center toward the surface substantially parabolically.

It was also found that the refractive index distribution over a cross section perpendicular to the light advance direction was such that the refractive index decreased substantially parabolically from the center toward the outer surface of the fiber, whereby the constant $a$ of the equation was 7.5 mm.$^{-2}$.

A part of a piece of this glass fiber of a length of approximately 10 cm. was deflected into a curved shape of a radius of curvature of 1 cm., and an incident light beam of a width of approximately 0.01 mm. was projected into the central part of one end surface of this glass fiber, whereupon the light beam advanced through and along the glass fiber interior along an undulating path and, moreover, without being reflected by the fiber outer surface until the light beam reached the other end of the fiber.

It was found that the width of the light beam thus reaching this other end of the fiber was substantially equal to the width of the light beam at the time of its incidence.

What is claimed is:

1. A method of producing a light-conducting glass fiber having a principal light-conducting center axis and having a distribution of refractive index wherein said index decreases continuously from the center axis toward the outer surface of the fiber in any cross section thereof perpendicular to the axis, which comprises: providing a glass fiber having a uniform refractive index therewithin and comprising at least one first oxide and at least one second oxide, each of said first and second oxides being initially distributed within the glass fiber with uniform concentrations, said second oxide being such that it is more vaporizable off the glass than said first oxide and that it is conducive to lowering the refractive index of the glass when it has vaporized off the glass; and maintaining said glass fiber at a temperature above the strain point thereof and in a gaseous atmosphere having a partial pressure of the vapor of said second oxide which is lower than the saturated vapor pressure at said temperature of said second oxide and being substantially free from any component which can enter the glass, for a time sufficient to vaporize and withdraw said second oxide from the outer surface of the fiber thereby to produce a concentration distribution of said first and second oxides within the glass fiber such that in any cross-section perpendicular to the center axis of the fiber said concentration of said first and second oxides respectively increases and decreases continuously from the center axis toward the surface of the fiber and that said concentration distribution produces a corresponding refractive index distribution, whereby said refractive index decreases continuously from the center axis toward the surface of the fiber.

2. A method of producing a light-conducting glass fiber as set forth in claim 1, in which said temperature is below the softening temperature of the glass fiber.

3. A method of producing light-conducting glass fibers as set forth in claim 1, in which said second oxide is at least one oxide selected from the group consisting of $Tl_2O$, $Cs_2O$, PbO, and CdO, and said first oxide is $SiO_2$.

4. A method of producing light-conducting glass fibers as set forth in claim 1, in which said gaseous atmosphere has a pressure lower than $10^{-2}$ mm. Hg.

5. A method of producing light-conducting glass fiber as set forth in claim 1, in which said time is so selected as to produce in a cross-section of the fiber perpendicular to the center axis of the fiber such concentration of said second oxide that it is substantially the same as the original one at the center and is slightly lower than the original one at a place slightly distant from the center, whereby said refractive index distribution substantially satisfies the equation: $n = n_0 (1 - ar^2)$, wherein $r$ is the radial distance from said axis of the fiber, $n_0$ is the refractive index of the glass fiber at said axis, $n$ is the refractive index of the glass fiber at the distance $r$, and $a$ is a positive constant.

6. A method of producing light-conducting glass fiber as set forth in claim 1, in which said time is so selected as to produce in a cross-section of the fiber perpendicular to the center axis of the fiber such concentration of said second oxide that it is lowered at the center, whereby said refractive index distribution substantially satisfies the equation: $n = n_0 (1 - ar^2)$, wherein $r$ is the radial distance from said axis of the fiber, $n_0$ is the refractive index of the glass fiber at said axis, $n$ is the refractive index of the glass fiber at the distance $r$, and $a$ is a positive constant.

References Cited

UNITED STATES PATENTS

| | | | |
|---|---|---|---|
| 2,319,816 | 5/1943 | Laad | 65—30 |
| 3,228,761 | 1/1966 | Jack et al. | 65—32 |
| 3,228,760 | 1/1966 | Jack et al. | 65—32 |
| 3,338,694 | 8/1967 | Daly | 65—32 |
| 3,495,964 | 2/1970 | Hares et al. | 65—30 |
| 3,647,406 | 3/1972 | Fisher | 65—30 |
| 3,650,598 | 3/1972 | Kitaiyo | 65—32 |
| 3,659,915 | 5/1972 | Maurer et al. | 65—30 |

FRANK W. MIGA, Primary Examiner

U.S. Cl. X.R.

65—3, 4, 30, Dig. 7; 106—50